United States Patent
Lindoff et al.

(10) Patent No.: US 11,632,711 B2
(45) Date of Patent: Apr. 18, 2023

(54) COMMUNICATION DEVICE AND METHOD FOR CELL SEARCH

(71) Applicant: Telefonaktiebolaget LM Ericsson (publ), Stockholm (SE)

(72) Inventors: Bengt Lindoff, Bjärred (SE); Joakim Axmon, Limhamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 463 days.

(21) Appl. No.: 16/606,850

(22) PCT Filed: Apr. 28, 2017

(86) PCT No.: PCT/EP2017/060250
§ 371 (c)(1),
(2) Date: Oct. 21, 2019

(87) PCT Pub. No.: WO2018/197014
PCT Pub. Date: Nov. 1, 2018

(65) Prior Publication Data
US 2020/0145909 A1    May 7, 2020

(51) Int. Cl.
*H04W 48/16* (2009.01)
*H04W 4/70* (2018.01)
(Continued)

(52) U.S. Cl.
CPC ............ *H04W 48/16* (2013.01); *H04W 4/70* (2018.02); *H04W 48/10* (2013.01); *H04W 88/06* (2013.01)

(58) Field of Classification Search
CPC .......................... H04W 72/0453; H04W 16/14
See application file for complete search history.

(56) References Cited

U.S. PATENT DOCUMENTS 9,258,413 B1 * 2/2016 Sikri ................. H04M 3/42246
2009/0268690 A1 * 10/2009 Sebire .................. H04W 48/10
370/332
(Continued)

FOREIGN PATENT DOCUMENTS

WO    2014169939 A1    10/2014
WO    2015020584 A2     2/2015

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 V14.1.0, Dec. 2016, pp. 1-46.
(Continued)

*Primary Examiner* — Khalid W Shaheed
(74) *Attorney, Agent, or Firm* — Murphy, Bilak & Homiller, PLLC

(57) ABSTRACT

A wireless communication device and method therein for cell scanning in a wireless communication networks are disclosed. The wireless communication device is capable of wireless communication with at least a first Radio Access Technology, RAT, at a first carrier frequency. The wireless communication device performs (410) a cell scanning on the first carrier frequency for determining a possible access node to connect to. When no synchronization signal on the first frequency is detected, or when a synchronization signal on the first frequency is detected but connection establishment procedure to the access node broadcasting the detected synchronization signal is unsuccessful, the wireless communication device obtains (420) system deployment information for the first carrier frequency and determines (430) at least a second carrier frequency for cell scanning based on the system deployment information. The wireless commu-
(Continued)

nication device then performs (440) cell scanning on the determined at least second carrier frequency.

20 Claims, 6 Drawing Sheets

(51) Int. Cl.
*H04W 48/10* (2009.01)
*H04W 88/06* (2009.01)

(56) References Cited

U.S. PATENT DOCUMENTS

| | | |
|---|---|---|
| 2017/0094621 A1* | 3/2017 | Xu .................. H04L 47/125 |
| 2017/0311250 A1* | 10/2017 | Rico Alvarino ...... H04W 48/18 |
| 2017/0318470 A1* | 11/2017 | Srikanteswara ...... H04W 16/14 |
| 2018/0097596 A1* | 4/2018 | Palanivelu .......... H04W 72/044 |
| 2018/0167948 A1* | 6/2018 | Egner ................. H04W 72/082 |
| 2018/0295007 A1* | 10/2018 | Kumar ................ H04J 13/00 |
| 2019/0028221 A1* | 1/2019 | Ratasuk ............... H04L 5/0048 |

OTHER PUBLICATIONS

"Cell Selection for NB-IoT", 3GPP TSG-RAN WG4 Meeting NB-IoT, R4-77AH-IoT-0091, Budapest, Hungary, Jan. 20-22, 2016, pp. 1-6.
"Inter-RAT idle mode mobility in NB-IoT", 3GPP TSG-RAN2 Meeting #95bis, R2-166567, Kaohsiung, Taiwan, Oct. 10-14, 2016, pp. 1-3.

* cited by examiner

Fig. 2

COMMUNICATION DEVICE AND METHOD FOR CELL SEARCH

TECHNICAL FIELD

Embodiments herein relate to communication devices and method therein for cell search. In particular, they relate to cell search for machine-to-machine (M2M) communication or Internet of Things (IoT) devices in a wireless communication network.

BACKGROUND

Wireless communication networks, such as Global System for Mobile Communications (GSM), Universal Mobile Telecommunications System (UMTS), Wideband Code Division Multiple Access (WCDMA) or High Speed Packet Access (HSPA), 3G Long Term Evolution (LTE), usually cover a geographical area which is divided into cell areas. Each cell area is served by a base station, which may also be referred to as a network node (NW), eNodeB (eNB), an access node, an access point etc. A wireless communication network may include a number of cells that can support communications for a number of wireless communication devices, such as user equipment (UE). Each cell or NW node may use certain carrier frequencies and cover certain system bandwidth. The NW node servers a wireless communication device via a communication link, which may be referred to as a serving node, cell, beam, sector etc. IoT network is a network of physical objects or devices, buildings, sensors, computers and other items connected through software and/or wireless communication networks. IoT communication, or Machine-to-machine (M2M) communication or machine type communication (MTC) may be used for establishing communication between machines and between machines and humans. The communication may comprise exchange of data, signaling, measurement data, configuration information etc. The IoT devices are quite often used for applications like sensing environmental conditions e.g. temperature reading, metering or measuring e.g. electricity usage etc., fault finding or error detection etc. In these applications the IoT devices are active very seldom but over a consecutive duration depending upon the type of service e.g. about 20-200 ms once every 2 seconds, about 50-500 ms every 60 minutes etc. The IoT devices may in many cases be stationary, or semi stationary, in the sense that mobility in view of classical cellular communication standards is not supported.

The path loss between IoT devices and a base station may be very large in some scenarios such as when used as a sensor or metering device located in a remote location such as in the basement of a building. In such scenarios the reception of signal from a base station is very challenging. For example, the path loss can be worse than 20 dB compared to normal operation. In order to cope with such challenges, the coverage in uplink and/or in downlink has to be substantially enhanced with respect to the normal coverage or legacy coverage. This is realized by employing one or a plurality of advanced techniques in the IoT devices and/or in the radio network node for enhancing the coverage. Some non-limiting examples of such advanced techniques are, but not limited to, transmit power boosting, repetition of transmitted signal, applying additional redundancy to the transmitted signal, use of advanced/enhanced receiver etc. In general, when employing such coverage enhancing techniques, the IoT devices is regarded to be operating in coverage enhancing mode or coverage extending mode. A low complexity communication device, e.g. an IoT device with only one receiver may also be capable of supporting enhanced coverage mode of operation. The coverage level of the IoT with respect to a cell may be expressed in terms of signal level such as signal quality, signal strength or path loss.

Narrow Band Internet of Things (NB-IoT) standard allows the IoT devices access to network services via Evolved-UMTS Terrestrial Radio Access (E-UTRA) with a channel bandwidth limited to 180 kHz. This addresses improved indoor coverage, supports for massive number of low throughput devices, low delay sensitivity, ultra-low device cost, low device power consumption and optimized network architecture.

The NB-IoT standard is designed for targeting 10 years of battery life length for devices/sensors in stationary use, having a small duty cycle, i.e. short transmission/reception time every few hours or so. Furthermore, it is very likely that NB-IoT standard Rel-13 also will be deployed in scenarios using nomadic mobility, for instance NB-IoT sensors placed in a container, train, car or lorry. In such scenarios, data may be transmitted e.g. every 60 min, and the device may wake up in a new cell. The device needs to detect and do a re-sync to a new possible cell. Depending on network deployment, the new NB-IoT cell may be on another carrier frequency, and in that case the device needs to perform cell scanning on other carrier frequencies as well. In such nomadic scenarios, the cell scanning time will have a significant impact on the life time of the battery, since in worst case, several carriers may have to be scanned. Due to the enhanced coverage support for NB-IoT, the carriers of a cell may be well buried in thermal noise, and therefore a long scanning, e.g. in minutes, might be needed per carrier the device is scanning on.

Hence, in order to reduce the battery consumption in such nomadic mobility scenarios for NB-IoT devices, there is a need for an efficient cell scanning method and apparatus to reduce average scanning time for the NB-IoT devices.

SUMMARY

It is therefore an object of embodiments herein to provide an improved method and apparatus for efficient cell scanning in a wireless communication network.

According to a first aspect of embodiments herein, the object is achieved by a method performed in a wireless communication device for cell scanning in a wireless communication networks. The wireless communication device is capable of wireless communication with at least a first Radio Access Technology (RAT), at a first carrier frequency. The wireless communication device performs a cell scanning on the first carrier frequency for determining a possible access node to connect to. When no synchronization signal on the first frequency is detected, or when a synchronization signal on the first frequency is detected but connection establishment procedure to the access node broadcasting the detected synchronization signal is unsuccessful, the wireless communication device obtains system deployment information for the first carrier frequency. The wireless communication device then determines at least a second carrier frequency for cell scanning based on the system deployment information and performs cell scanning on the determined at least second carrier frequency.

According to a second aspect of embodiments herein, the object is achieved by a wireless communication device for cell scanning in a wireless communication networks. The wireless communication device is capable of wireless communication with at least a first Radio Access Technology (RAT), at a first carrier frequency. The wireless communication device is configured to perform a cell scanning on the first carrier frequency for determining a possible access node to connect to. When no synchronization signal on the first frequency is detected, or when a synchronization signal on the first frequency is detected but connection establishment procedure to the access node broadcasting the detected synchronization signal is unsuccessful, the wireless communication device is configured to obtain system deployment information for the first carrier frequency. The wireless communication device is further configured to determine at least a second carrier frequency for cell scanning based on the system deployment information and perform cell scanning on the determined at least second carrier frequency.

The embodiments herein provides a cell scanning method for a communication device, e.g. an IoT device or MTC device in an MTC standard, in case the device has lost the connection to a network node or access node/point of a cell on an earlier used first carrier, for instance after a long Discontinuous Reception (DRX) cycle, or when the device has moved away from a serving cell. Upon failure of connection to a cell on a first carrier, system deployment information describing what type of MTC system deployment, i.e. what RAT, that is used, is used for determining at least one second carrier frequency to perform a cell scanning on. The deployment system information may comprise different modes of operation such as a standalone operation, a guard band operation or an in-band operation. With this information, one or a few possible second carrier frequencies may be determined to scan on. In this way, the communication device may not need to scan all possible carrier frequencies. Thereby an average search time for determining a cell in case of a need for a re-sync in a nomadic mobility scenario is reduced, which in turn increases the battery life length of an IoT device or sensor.

Therefore the embodiments herein provide an improved method and apparatus allowing for an efficient cell scanning of carrier frequencies in a wireless communication network.

BRIEF DESCRIPTION OF THE DRAWINGS

Examples of embodiments herein are described in more detail with reference to attached drawings in which:

FIG. 2 is a schematic block diagram illustrating allowed NB-IoT Physical Resource Blocks (PRBs) for in-band operation in LTE for different bandwidths;

DETAILED DESCRIPTION

Figure 1:
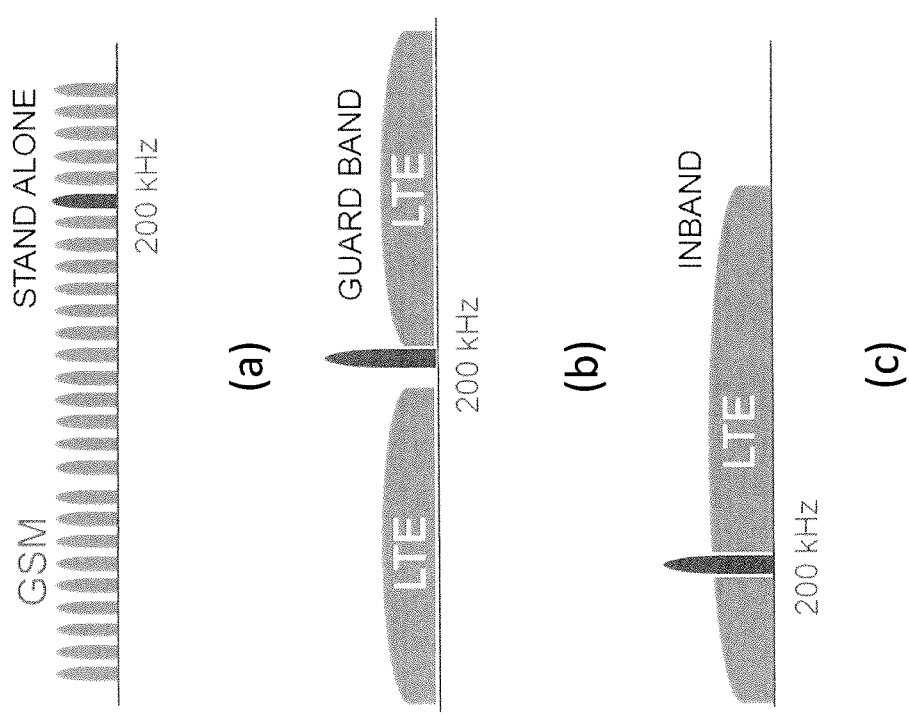
FIG. 1 is a schematic block diagram illustrating NB-IoT deployment scenarios, where (a) stand alone, (b) guard band and (c) in-band.

As part of developing embodiments herein, the NB-IoT operation will be first described. The NB-IoT carrier bandwidth (BW) is 180 KHz. Examples of operating bandwidth of LTE are 1.4 MHz, 3 MHz, 5 MHz, 10 MHz, 15 MHz, 20 MHz etc. The NB-IoT supports 3 different modes of operation, which are shown in FIG. 1 (a), (b), (c):

(a) Stand-alone operation: utilizing for example the spectrum currently being used by GSM/EDGE Radio Access Network (GERAN) systems as a replacement of one or more GSM carriers. In principle it operates on any carrier frequency which is neither within the coverage of a carrier of another system nor within a guard band of another system's operating carrier. The other system can be another NB-IoT operation or any other RAT e.g. LTE.

(b) Guard band operation: utilizing the unused resource blocks (RB) within a LTE carrier's guard-band. Guard band may also interchangeably be refereed as guard bandwidth. As an example in case of LTE bandwidth (BW) of 20 MHz, i.e. BW=20 MHz or 100 RBs, each RB comprising 180 KHz, the guard band operation of NB-IoT may be placed anywhere outside the central 18 MHz but within 20 MHz of the LTE BW.

Figure 2:
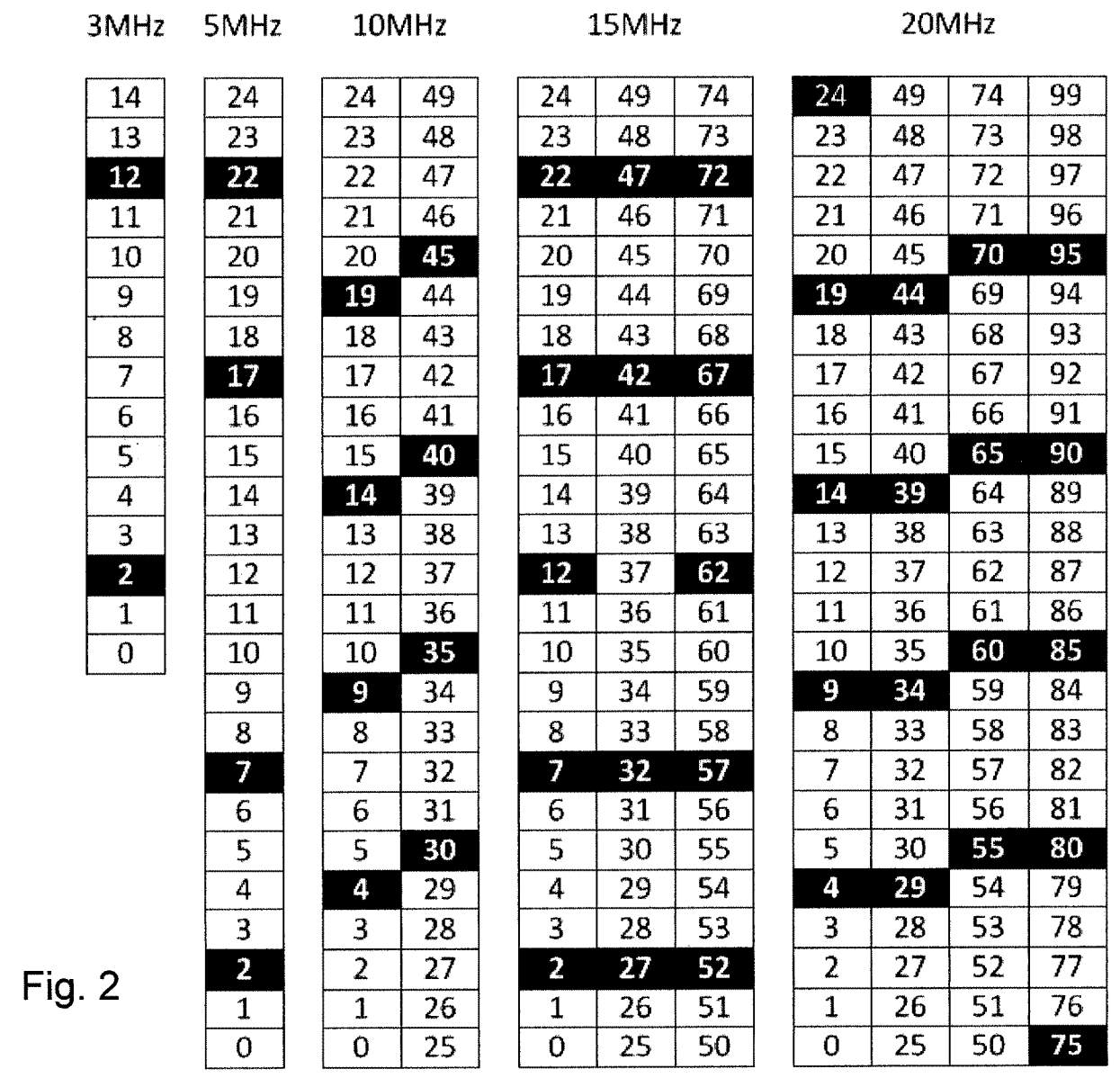

(c) In-band operation: utilizing resource blocks within the coverage of a normal LTE carrier. The in-band operation may also interchangeably be refereed as in-bandwidth operation. More generally the operation of one RAT within the BW of another RAT is also called in-band operation. As an example in an LTE BW of 50 RBs, i.e. BW=10 MHz or 50 RBs, the NB-IOT operation over one resource block (RB) within the 50 RBs is called in-band operation. FIG. 2 shows allowed NB-IoT PRBs for in-band operation in LTE for different BWs.

In NB-IoT, downlink (DL) transmission is based on Orthogonal Frequency-Division Multiplexing (OFDM) with 15 kHz subcarrier spacing and has same symbol and cyclic prefix durations as for legacy LTE for all the above operation scenarios. For uplink (UL) transmission, both multi-tone transmissions based on Single-Carrier Frequency-Division Multiple Access (SC-FDMA), and single tone transmission are supported. This means that the physical waveforms for NB-IoT in downlink and also partly in uplink are similar to legacy LTE.

In the downlink, NB-IoT supports both master information broadcast and system information broadcast. System information is provided via a Master Information Block (MIB-NB) that is transmitted on Narrowband Physical Broadcast Channel (NPBCH) and System Information Block (SIB-NB) that is transmitted on Narrowband Physical Downlink Shared Channel (NPDSCH). For in-band operation, it is possible for NB-IoT devices to decode NPBCH without knowing the legacy PRB index. Once MIB-NB is decoded, the legacy PRB index could be extracted from the information contained in the MIB. NB-IoT supports both narrowband physical downlink control channel (NPDCCH) and NPDSCH. The operation mode of the NB-IOT must be indicated to the device, and that is indicated by means of MIB-NB. Two new downlink synchronization signals have been introduced, such as Narrowband Primary Synchronization Signal (NPSS) and Narrowband Secondary Synchronization Signal (NSSS), with a single instance of NPSS and 504 instances of NSSS. The repetition rate of NPSS is every 10 ms and NSSS 20 ms over 80 ms. The downlink subcarrier spacing is 15 kHz and the NB-IoT downlink system bandwidth is to be 200 kHz, with efficient bandwidth of 180 kHz. This is equivalent to a physical resource block in a conventional LTE cell.

The uplink channels are Narrowband Physical Random Access Channel (NPRACH) and Narrowband Physical Uplink Shared Channel (NPUSCH). Notably there is no physical uplink control channel. Additionally, Uplink Demodulation Reference Signals (DMRS) are specified.

Two different subcarrier spacings are possible: 15 kHz and 3.75 kHz. The first one is the same as for other LTE standards and leads to a total of 12 subcarriers while the second one leads to a total of 48 subcarriers. Single tone transmissions can use both subcarrier spacings while SC-FDMA transmissions can only use the 15 kHZ subcarrier spacing.

In NB-IoT standard Rel-13, it is furthermore focusing on stationary devices, i.e. no Radio Resource Management (RRM) mobility or formal cell reselection is defined. Hence mobility supported is more of nomadic type, i.e. the device needs to reconnect to a possibly new cell, once woken up after, e.g. 50 minutes, if determined that the old cell does not exist anymore.

Embodiments herein will provide an efficient cell scanning method and apparatus to reduce average scanning time for the NB-IoT devices in a wireless communication network.

Figure 3:
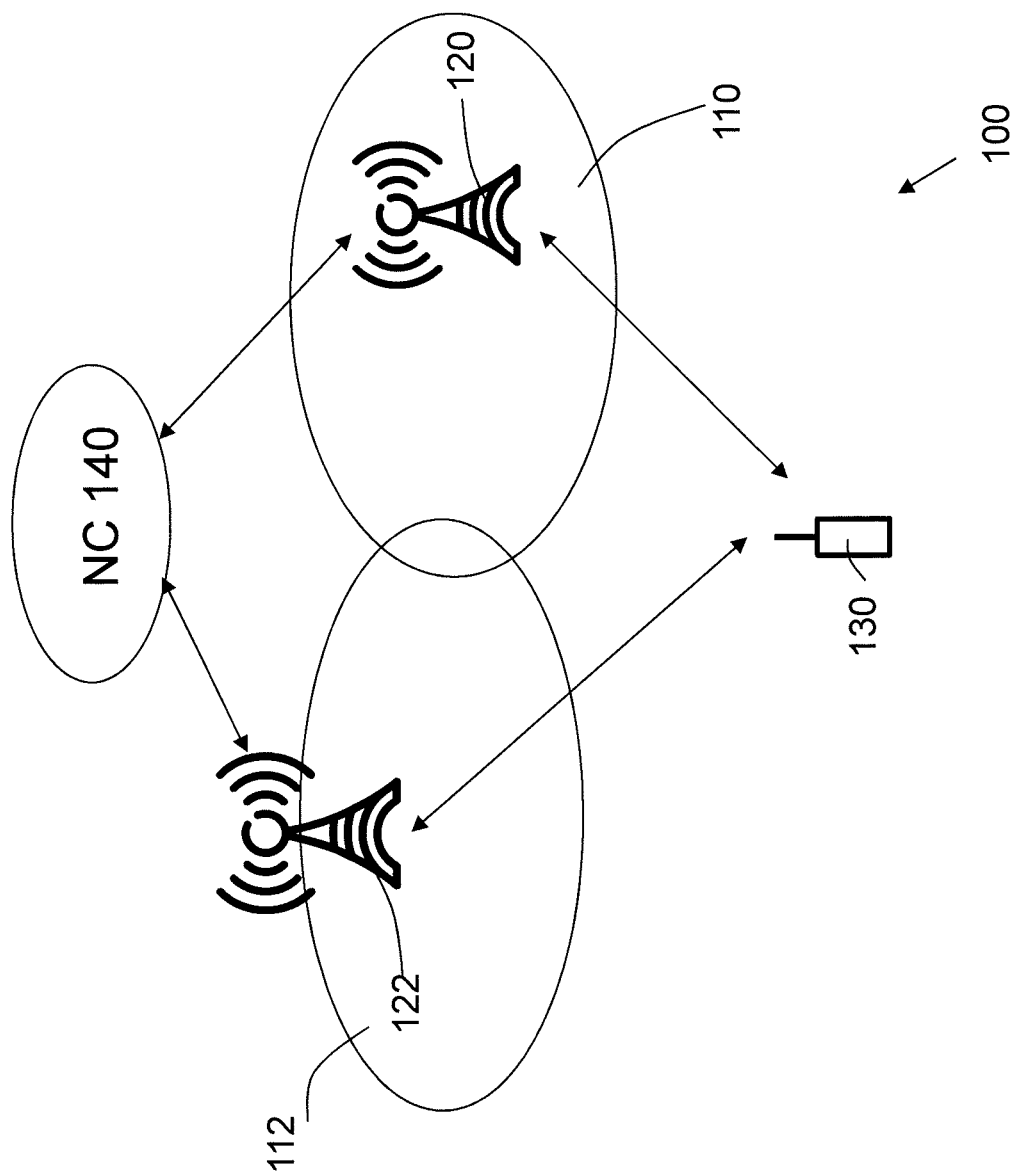
FIG. 3 is a schematic block diagram illustrating embodiments of a wireless communication network.

FIG. 3 depicts an example of a wireless communication network 100 in which embodiments herein may be implemented. The wireless communication network 100 may be any wireless system or cellular network, such as GSM network, a Long Term Evolution (LTE) network, any $3^{rd}$ Generation Partnership Project (3GPP) cellular network, Worldwide interoperability for Microwave Access (Wimax) network, Wireless Local Area Network (WLAN/Wi-Fi), a Fourth Generation (4G) network, a Fifth Generation (5G) cellular network etc.

The wireless communication network 100 comprises a plurality of cells whereof two, a first cell 110 comprising a first Access Node (AN) 120 and a second cell 112 comprising a second Access Node 122, are depicted in FIG. 1. The first Access Node 120 serves the first cell 110, while the second Access Node 122 serves the second cell 112. The first Access Node 120, the second Access Node 122 are network access nodes which each may be, for example, an eNB, gNB, eNodeB, gNodeB or a Home Node-B, Home eNode-B, Home gNode-B, or an access point.

For the sake of easier understanding by the reader, the term "cell" has been used above. However, spatial division between operation areas of a network node may be based on other entities, such as sectors, beams, etc. Sectors are statically defined directions from an antenna of the network node and beams are dynamically defined directions from an antenna of the network node. Thus, for any disclosure herein where the term "cell" is used, the demonstrated principles are equally feasible for sectors, beams, etc., unless explicitly or implicitly expressed otherwise.

The wireless communication network 100 may further comprise a Network Controller 140 which communicates with the first and second access nodes 120, 122, and acts as a handling unit or a controller for different Radio Access Technologies. The Network Controller 140 may be a separate node as depicted in the figure, or its corresponding functionalities may be incorporated within another network node such as e.g. the Access nodes 120, 122.

A plurality of wireless communication devices operates in the wireless communication network 100, whereof a wireless communication device 130 is depicted. The wireless communication device 130 may be any IoT device, such as a user equipment, a mobile wireless terminal or a wireless terminal, a mobile phone, a sensor or actuator, a drone with wireless capabilities or any other radio network units capable to communicate over a radio link in a wireless communication network. As shown in FIG. 3, the wireless communication device 130 may communicate with the first and second Access Nodes 120, 122, and the NW node 120 servers or has served the wireless communication device 130 via a communication link, which may be referred to as a serving node, cell, beam, sector etc.

The wireless communication device 130, e.g. an IoT sensor, may in stationary use have a small duty cycle, i.e. short transmission/reception time every few hours or so. When it is used in nomadic mobility, e.g. when it is placed in a container, train, car or lorry, data may be transmitted every 60 min, the wireless communication device 130 may wake up in a new cell. Then wireless communication device 130 needs to detect that, and do a re-sync to a new possible cell, e.g. the second cell 112.

Figure 4:
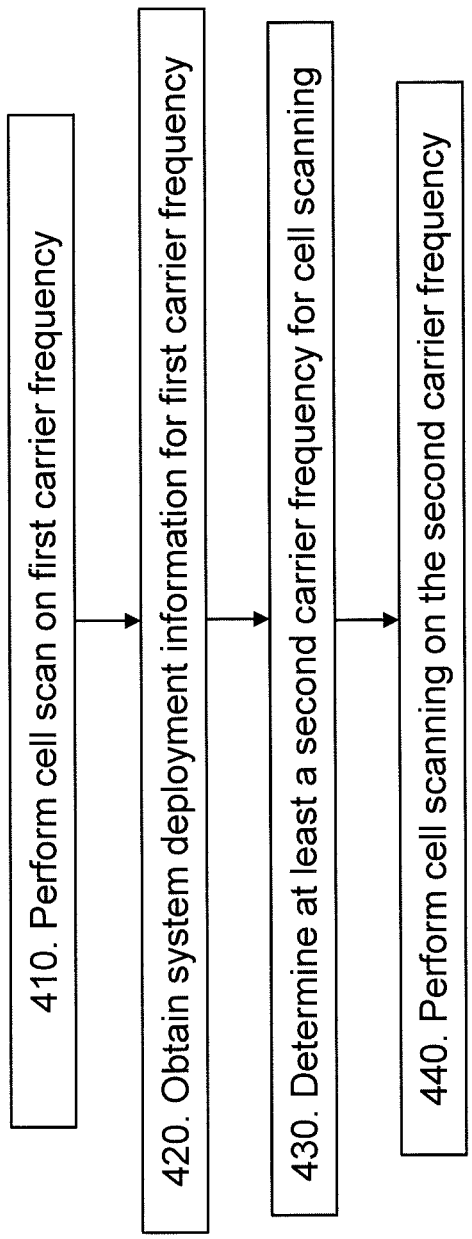
FIG. 4 is a flowchart depicting one embodiment of a method performed in a wireless communication device.

FIG. 4 shows a flow chart of a method performed in a wireless communication device 130 for scanning cell in the wireless communication networks 100 according to the embodiments herein. It is assumed that the wireless communication device 130 operating in the wireless communication networks 100 using a first RAT, e.g. according to NB-IoT standard, has been connected to a remote NW node, e.g. the first Access Node 120 at a first carrier frequency F1 for communication before it is turned off or goes to sleep mode. The method comprises the following actions, which actions may be taken in any suitable order:

Action 410

When the wireless communication device 130 is turned on or wakes up at a certain time after a long DRX cycle, the wireless communication device 130 may have lost the connection to an access node on an earlier used first carrier frequency, or the wireless communication device 130 may have moved away from the serving cell, re-connection or re-synchronization to an access node is started at the first carrier frequency F1.

The wireless communication device 130 performs a cell scan on the first carrier frequency F1 for determining a possible access node to connect to. For example, the wireless communication device 130 searches for NPSS and NSSS for the last connected access node, e.g. the first AN 120. However it may also be searching for any access node on the first carrier frequency F1.

Action 420

If the re-connection/re-synchronization is succeeded, i.e. NPSS and/or NSSS are detected, and connection establishment procedure is successful, the communication continues. In case the re-connection/re-synchronization failed, e.g. no NPSS or NSSS is detected, or when NPSS/NSSS is detected, but connection establishment procedure is unsuccessful, the wireless communication device 130 obtains system deployment information for the first carrier frequency F1.

According to some embodiments, the wireless communication device 130 may have received and stored at least information related to system deployment information for the particular first RAT broadcasted from the first access node 120 on the first frequency F1. Then the wireless communication device 130 retrieves, e.g. by a control unit, the stored broadcast information and obtain/determines the system deployment information for carrier frequency F1.

For example, according to NB-IoT standard, the system deployment information, i.e. the operation mode information (operationModeInfo) may be determined from the MIB-NB, such as:

Inband-SamePCI indicates an in-band deployment and that the NB-IoT and LTE cell share the same physical cell id and have the same number of NB Reference Signal (NRS) and cell specific reference signal (CRS) ports.

Inband-DifferentPCI indicates an in-band deployment and that the NB-IoT and LTE cell have different physical cell id.

guardband indicates a guard-band deployment.

standalone indicates a standalone deployment.

Therefore according to some embodiments herein, the system deployment information may be related to whether the first RAT is deployed in any one of:
- (a) a standalone operation, wherein carrier frequencies of the first RAT are independent of a second RAT;
- (b) a guard band operation, wherein carrier frequencies of the first RAT are in a guard band of a second RAT;
- (c) an in-band operation, wherein carrier frequencies of the first RAT are within bandwidth of a second RAT.

According to some embodiments herein, the system deployment information may be determined from a Subscriber Identity module (SIM) card, hard coded or pre-programmed in the wireless communication device 130.

According to some embodiments herein, the system deployment information may be received over a third RAT, for example WiFi.

Action 430

Depending on the network deployment, the possible cell for the wireless communication device 130 to re-connect to may be on another carrier frequency. Upon failure of connection to a cell or an access node on the first carrier F1, the wireless communication device 130 determines at least a second carrier frequency F2 for cell scanning based on the system deployment information.

For example, the stored system deployment information describes what type of MTC system deployment that is used, is used for determining the at least second carrier frequency F2 to perform a cell scan on.

According to some embodiments herein, the second carrier frequency may be determined from information in broadcast information. The broadcast information may be in MIB-NB according to NB-IoT standard.

Action 440

The wireless communication device 130 performs cell scanning on the determined at least second carrier frequency F2.

Figure 5:
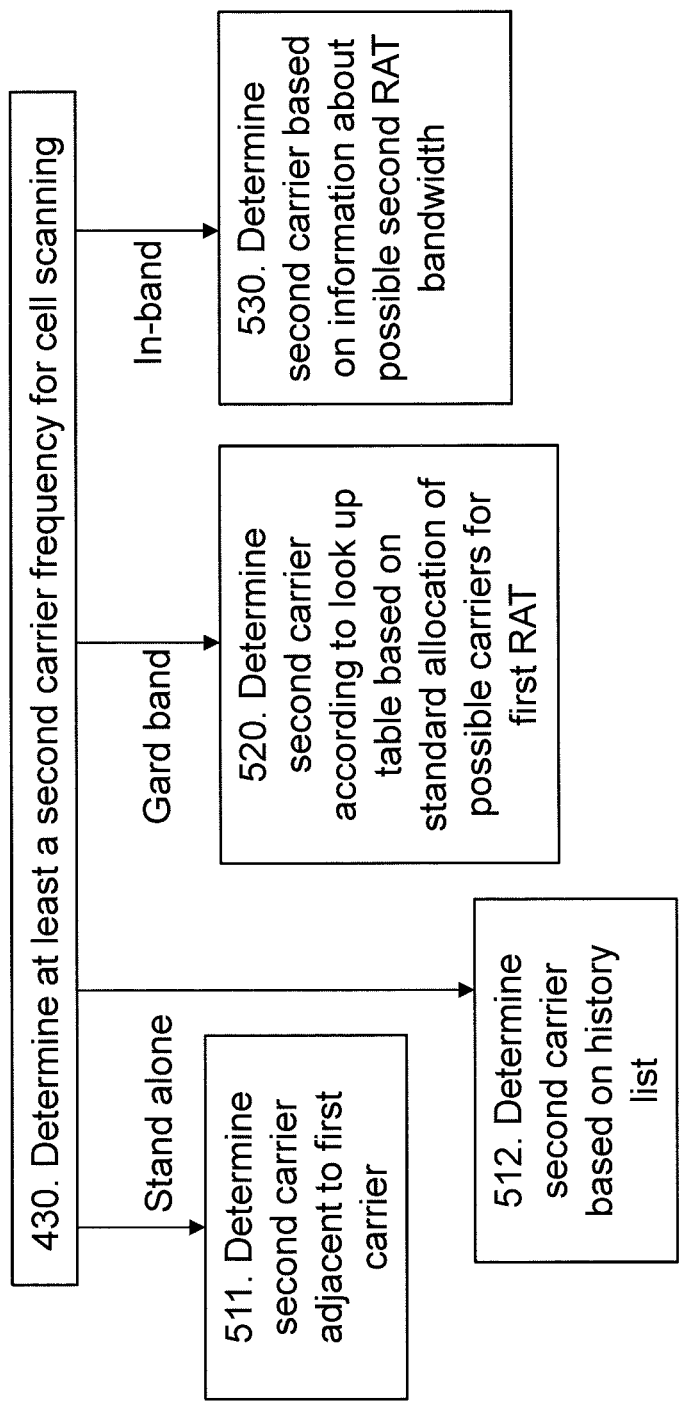
FIG. 5 is a flowchart depicting embodiments of a method in a wireless communication device.

FIG. 5 shows a particular embodiment suitable for a NB-IoT device to perform the Action 430. The NB-IoT device/sensor read the stored MIB-NB parameters, e.g. OperationModeInfo, in the MIB-NB and determines the second carrier frequency F2 to perform cell scanning/cell search on.

For example, If operationModeInfo=standalone, the NB-IoT device knows that there is no dependency on another, second, RAT in the deployment. For instance, the NB-IoT device may use the GSM 900 band that has been re-farmed to allow for NB-IOT. Hence in this case, the NB-IoT device may choose the next possible carrier frequency, i.e. adjacent to the first carrier frequency F1, or 200 kHz away from the first carrier frequency F1, as the second carrier frequency F2, in Action 511. In another example, the IoT device may have stored earlier used carrier frequencies, e.g. a history list, for stand-alone operation and hence try that frequency for cell scanning, in Action 512.

If operationModeInfo=guardband, the IoT device knows in this case that the first carrier frequency F1 is deployed at the edge of a second RAT, e.g. LTE. Furthermore, the IoT device may store information about LTE BWs, such as 3, 5, 10, 15, 20 MHz, and corresponding number of PRBs as shown in FIG. 2. Hence the IoT device can assume that other possible carrier frequencies are also deployed in the guard band. Then the IoT device may determine likely second carrier frequencies in the currently used band based on knowledge of LTE system BW. The IoT device may search for possible NB-IoT cells, on a second carrier frequency F2, e.g. 1 LTE system BW, 3, 5, 10, 15 or 20 MHz away from the first carrier frequency F1. That is the second carrier frequency F2 may be determined from MIB-NB parameters according to a look up table based on standard allocation of possible carriers for the first RAT, in Action 520.

If operationModeInfo=inband, either same or different Physical Cell Identity (PCI), the IoT device knows in this case that the first carrier frequency F1 is within the LTE system BW from the other MIB-NB information. Using the knowledge of the NB-IoT standard, it can identify the allowed NB-IoT anchor carriers, i.e. carriers that carry NPSS and NSSS, depending on the LTE system BW. Hence, in Action 530, the IoT device can determine the second carrier frequency F2 based on information about possible second RAT bandwidth, e.g. as shown in FIG. 2, allowed carriers according to the IoT/MTC system standard may be used as candidates for the secondary carrier frequency. That is the second carrier frequency F2 may be determined based on a look up table including possible second RAT system bandwidth.

In the description above, embodiments are exemplified using NB-IoT as the first RAT that allows the IoT devices access to network services with a channel bandwidth limited to 180 kHz within E-UTRA, i.e. LTE as a second RAT. Hence the first RAT may have smaller BW than a second RAT. In other embodiments one can interpret the first RAT as an operational mode with smaller BW of a second RAT with a larger BW. So the first RAT may be the same as the second RAT. Furthermore, system deployment information is related to how the first RAT is deployed in relation to other RATs, for instance a second RAT according to MTC standard. It may be deployed in other operation mode, and is not limited to, operation modes described above, e.g. deployed in a standalone operation mode without relation to a second RAT, in a guard band of a second RAT, or in-band of a second RAT etc.

To summarize above discussions, embodiments herein provide a cell scanning method for a communication device, e.g. an IoT device or MTC device in an MTC standard, in case the device has lost the connection to a network node or access node/point of a cell on an earlier used first carrier. Upon failure of connection to a cell on a first carrier, system deployment information describing what type of MTC system deployment, i.e. what RAT, that is used, is used for determining at least one second carrier frequency to perform a cell scanning on. The deployment system information may comprise different modes of operation such as a standalone operation, a guard band operation or an in-band operation. With this information, one or a few candidate second carrier frequencies may be determined to scan on. In this way, the communication device may not need to scan all possible carrier frequencies. Thereby an average search time for determining a cell in case of a need for a re-sync in a nomadic mobility scenario is reduced, which in turn increases the battery life length of an IoT device or sensor.

Figure 6:
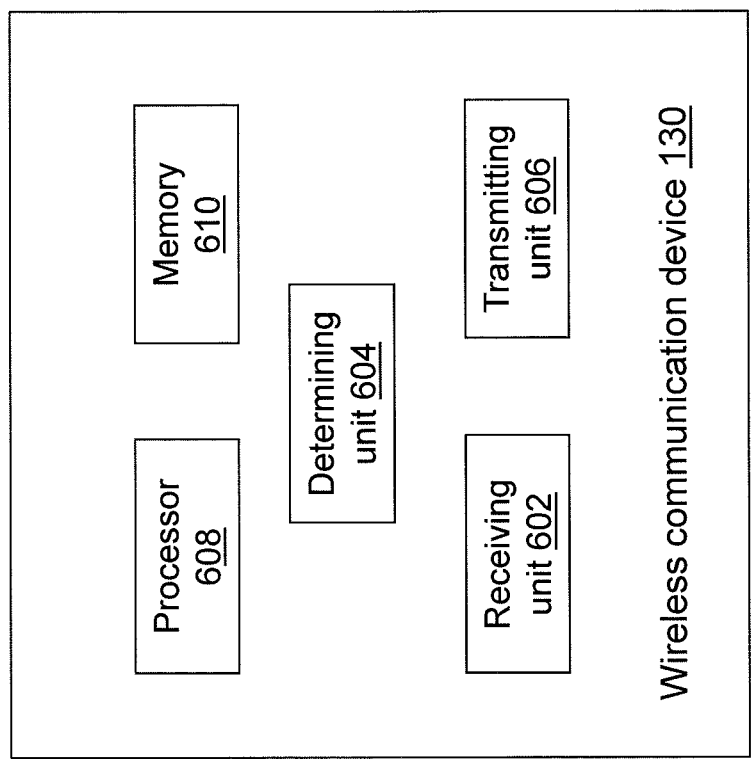
FIG. 6 is a schematic block diagram illustrating embodiments of a wireless communication device.

To perform the method actions in the wireless communication device 130 for cell scanning in the wireless communication network 100 described above in relation to FIGS. 4 and 5, the wireless communication device 130 comprises circuits or units as depicted in FIG. 6. The wireless communication device 130 comprises e.g. a receiving unit 602, a determining unit 604, a transmitting unit 606, a processor 608 and a memory 610.

The wireless communication device 130 is configured to, e.g. by means of the receiving unit 602 being configured to, perform a cell scanning on the first carrier frequency for determining a possible access node to connect to.

When no synchronization signal on the first frequency is detected, or when a synchronization signal on the first frequency is detected but connection establishment procedure to the access node broadcasting the detected synchronization signal is unsuccessful, the wireless communication device 130 is further configured to, e.g. by means of the determining unit 604 and/or the receiving unit 602 being configured to, obtain system deployment information for the first carrier frequency.

There are several ways to obtain the system deployment information as discussed above, e.g. determined from a Subscriber Identity module (SIM) card, hard coded or preprogrammed in the wireless communication device 130, or received over a third RAT, for example WiFi, or received in broadcast information, e.g. in MIB-NB, etc.

Based on the system deployment information, e.g. an MIB-NB parameter, operationModeInfo, which indicates what mode the wireless communication device 130 may operate in, the wireless communication device 130 may be further configured to, e.g. by means of the determining unit 604 being configured to, determine the second frequency based on a look up table including possible first RAT carriers, or determine the second frequency based on a look up table including possible second RAT system bandwidths, or determine the second frequency that is adjacent to the first carrier frequency, or determine the second frequency based on a history list comprising earlier used carrier frequencies for the wireless communication device 130.

Those skilled in the art will appreciate that the receiving unit 602, the determining unit 604 and the transmitting unit 606 described above in the wireless communication device 130 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for the wireless communication device 130 to perform cell scanning in the wireless communication network 100, may be implemented through one or more processors, such as the processor 608 in the wireless communication device 130, together with computer program code for performing the functions and actions of the embodiments herein. The program code mentioned above may also be provided as a computer program product, for instance in the form of a data carrier carrying computer program code for performing the embodiments herein when being loaded into the wireless communication device 130. One such carrier may be in the form of a CD ROM disc. It is however feasible with other data carriers such as a memory stick. The computer program code may furthermore be provided as pure program code on the cloud and downloaded to the wireless communication device 130.

The memory 610 in the wireless communication device 130 may comprise one or more memory units and may be arranged to be used to store system deployment information, look up tables, historic lists, data, configurations and applications to perform the methods herein when being executed in the wireless communication device 130.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method, performed in a wireless communication device, for cell scanning in a wireless communication network, wherein the wireless communication device is Internet-of-Things (IoT) device capable of wireless communication with at least a first Radio Access Technology (RAT) according to Narrow Band IoT (NB-IoT) standard, the method comprising:
    performing cell scanning on a first carrier frequency (F1) for determining a possible access node to connect to;
    in response to either of the following conditions, obtaining system deployment information for F1:
        when no synchronization signal is detected on F1, or
        when a synchronization signal is detected on F1 but a connection establishment to an access node associated with the detected synchronization signal is unsuccessful;
    determining at least a second carrier frequency (F2) for cell scanning based on the system deployment information; and
    performing cell scanning on the determined at least F2,
    wherein the system deployment information is related to whether the first RAT is deployed in one of the following:
        standalone operation, wherein carrier frequencies of the first RAT are independent of a second RAT;
        guard band operation, wherein carrier frequencies of the first RAT are in a guard band of a second RAT; or
        in-band operation, wherein carrier frequencies of the first RAT are within a bandwidth of a second RAT.

2. The method according to claim 1, wherein the first RAT is a bandwidth-limited network service of the second RAT.

3. The method according to claim 1, wherein the second RAT is Long Term Evolution (LTE) Evolved-UMTS Terrestrial Radio Access (E-UTRA) technology.

4. The method according to claim 1, wherein the system deployment information is obtained from a Subscriber Identity module (SIM) in the wireless communication device.

5. The method according to claim 1, wherein the system deployment information is hard-coded or pre-programmed in the wireless communication device.

6. The method according to claim 1, wherein obtaining the system deployment information comprises receiving the system deployment information via a third RAT.

7. The method according to claim 1, wherein obtaining the system deployment information comprises receiving the system deployment information via information broadcast by the wireless communication network.

8. The method according to claim 7, wherein the information broadcast by the wireless communication network includes a Narrow Band Master Information Block (MIB-NB).

9. The method according to claim 1, wherein F2 is determined based on at least one of the following:
    a look up table including possible first RAT carriers;
    a look up table including possible second RAT system bandwidths; and
    a history list comprising earlier used carrier frequencies for the wireless communication device.

10. The method according to claim 1, wherein F2 is determined to be adjacent to F1.

11. A wireless communication device configured for cell scanning in a wireless communication network, wherein the wireless communication device is Internet-of-Things (IoT) device capable of wireless communication with at least a first Radio Access Technology (RAT) according to Narrow Band IoT (NB-IoT) standard, wherein the wireless communication device comprises:
one or more processors; and
memory storing computer-executable instructions that, when executed by the one or more processors, configure the wireless communication device to:
perform cell scanning on a first carrier frequency (F1) for determining a possible access node to connect to;
in response to either of the following conditions, obtain system deployment information for F1:
when no synchronization signal is detected on F1, or
when a synchronization signal is detected on F1 but a connection establishment to an access node associated with the detected synchronization signal is unsuccessful;
determine at least a second carrier frequency (F2) for cell scanning based on the system deployment information; and
perform cell scanning on the determined at least F2,
wherein the system deployment information is related to whether the first RAT is deployed in one of the following:
standalone operation, wherein carrier frequencies of the first RAT are independent of a second RAT;
guard band operation, wherein carrier frequencies of the first RAT are in a guard band of a second RAT; or
in-band operation, wherein carrier frequencies of the first RAT are within a bandwidth of a second RAT.

12. The wireless communication device according to claim 11, wherein the first RAT is a bandwidth limited network service of the second RAT.

13. The wireless communication device according claim 11, wherein the second RAT is Long Term Evolution (LTE) Evolved-UMTS Terrestrial Radio Access (E-UTRA) technology.

14. The wireless communication device according to claim 11, wherein the system deployment information is obtained from a Subscriber Identity module (SIM) in the wireless communication device.

15. The wireless communication device according to claim 11, wherein the system deployment information is hard-coded or pre-programmed in the wireless communication device.

16. The wireless communication device according to claim 11, wherein execution of the instructions configures the wireless communication device to obtain system deployment information by receiving the system deployment information over a third RAT.

17. The wireless communication device according to claim 11, wherein execution of the instructions configures the wireless communication device to obtain system deployment information by receiving the system deployment information via information broadcast by the wireless communication network.

18. The wireless communication device according to claim 11, wherein F2 is determined based on at least one of the following:
a look up table including possible first RAT carriers;
a look up table including possible second RAT system bandwidths; and
a history list comprising earlier used carrier frequencies for the wireless communication device.

19. The wireless communication device according to claim 11, wherein the second carrier frequency is determined to be adjacent to the first carrier frequency.

20. The wireless communication device according to claim 18, wherein the information broadcast by the wireless communication network includes a Narrow Band Master Information Block (MIB-NB).

* * * * *